US008954221B2

(12) United States Patent
Ohsaki

(10) Patent No.: US 8,954,221 B2
(45) Date of Patent: Feb. 10, 2015

(54) EMISSION DETERIORATION NOTIFYING DEVICE

(75) Inventor: Satoru Ohsaki, Chiryu (JP)

(73) Assignee: Denso Corporation, Kariya (JP)

( * ) Notice: Subject to any disclaimer, the term of this patent is extended or adjusted under 35 U.S.C. 154(b) by 143 days.

(21) Appl. No.: 13/182,760

(22) Filed: Jul. 14, 2011

(65) Prior Publication Data

US 2012/0022740 A1 Jan. 26, 2012

(30) Foreign Application Priority Data

Jul. 23, 2010 (JP) ................................ 2010-166368

(51) Int. Cl.

| | |
|---|---|
| ***G01M 17/00*** | (2006.01) |
| ***F02D 41/22*** | (2006.01) |
| ***F02D 41/02*** | (2006.01) |
| ***F02D 41/14*** | (2006.01) |
| *F02D 41/12* | (2006.01) |
| *F02D 41/24* | (2006.01) |
| *F02D 41/30* | (2006.01) |

(52) U.S. Cl.

CPC ............ *F02D 41/22* (2013.01); *F02D 41/0235* (2013.01); *F02D 41/123* (2013.01); *F02D 41/1446* (2013.01); *F02D 41/2403* (2013.01); *F02D 41/3035* (2013.01); *F02D 2041/228* (2013.01); *F02D 2200/0602* (2013.01); *F02D 2200/0802* (2013.01)

USPC ........................................................ 701/31.1

(58) Field of Classification Search

CPC ......................... F02D 2014/223; F02D 41/222

USPC ............... 701/29, 29.1, 29.7, 30.1, 30.9, 31.1

See application file for complete search history.

(56) References Cited

U.S. PATENT DOCUMENTS

| | | | | |
|---|---|---|---|---|
| 5,058,547 | A * | 10/1991 | Morikawa | 123/198 D |
| 5,327,872 | A * | 7/1994 | Morikawa | 123/516 |
| 5,671,141 | A * | 9/1997 | Smith et al. | 701/33.6 |
| 6,138,638 | A | 10/2000 | Morikawa | |
| 6,223,731 | B1 * | 5/2001 | Yoshiume et al. | 123/497 |
| 6,701,905 | B1 * | 3/2004 | Gaskins | 123/674 |
| 7,805,985 | B2 * | 10/2010 | Friedl et al. | 73/114.45 |

(Continued)

FOREIGN PATENT DOCUMENTS

JP 2006-283737 10/2006

OTHER PUBLICATIONS

"2010 My OBD System Operation Summary for Gasoline Engines", Ford Motor Company, Revision Date Apr. 6, 2009 235 pages.

*Primary Examiner* — Behrang Badii
*Assistant Examiner* — Daniel L Greene
(74) *Attorney, Agent, or Firm* — Nixon & Vanderhye PC

(57) ABSTRACT

An emission deterioration notifying device includes a low fuel pressure determining unit, an emission deterioration notifying unit, and an electric control unit. The determining unit determines whether supply pressure of fuel supplied to an injector is in a low fuel pressure state, in which the supply pressure is lower than a predetermined threshold value. The notifying unit notifies that exhaust emission is deteriorating beyond its allowable range when it is determined that the supply pressure is in the low fuel pressure state. The control unit allows notification by the notifying unit at a time of injection control at which injection of fuel from the injector is allowed, and the control unit prohibits notification by the notifying unit or reduces the threshold value at a time of injection stop control at which injection of fuel from the injector is stopped.

10 Claims, 6 Drawing Sheets

(56) References Cited

U.S. PATENT DOCUMENTS

| | | | | |
|---|---|---|---|---|
| 2004/0245034 | A1 * | 12/2004 | Miyamoto et al. | 180/170 |
| 2005/0274353 | A1 * | 12/2005 | Okubo et al. | 123/299 |
| 2007/0163536 | A1 * | 7/2007 | Okubo et al. | 123/295 |
| 2008/0041331 | A1 * | 2/2008 | Puckett | 123/198 D |
| 2008/0276906 | A1 * | 11/2008 | Thomas | 123/457 |
| 2009/0164101 | A1 * | 6/2009 | Kageyama | 701/103 |
| 2012/0004801 | A1 * | 1/2012 | Watanabe | 701/22 |

* cited by examiner

EMISSION DETERIORATION NOTIFYING DEVICE

CROSS REFERENCE TO RELATED APPLICATION

This application is based on and incorporates herein by reference Japanese Patent Application No. 2010-166368 filed on Jul. 23, 2010.

BACKGROUND OF THE INVENTION

1. Field of the Invention

The present invention relates to an emission deterioration notifying device that notifies exhaust emission deterioration in the case of deterioration of exhaust emission beyond its acceptable range.

2. Description of Related Art

Among spark ignition type internal combustion engines, in a direct injection type internal combustion engine that directly injects fuel into its combustion chamber, it is important for achieving satisfactory exhaust emission to inject high-pressure fuel so as to promote fuel atomization, in comparison with the case of a port injection type (see JP-A-2006-283737).

For this reason, if the pressure of fuel supplied to an injector is smaller than a predetermined value, it is necessary that a driver should be notified that exhaust emission is deteriorating beyond its permissible range, through the operation of an emission deterioration notifying means such as a warning lamp.

Injection stop control for stopping fuel injection from the injector is sometimes carried out even though the engine is in operation. For example, in a fuel pressure increase period after the engine is started to begin operation of a fuel pump until the pressure of fuel supplied to the injector increases to reach a predetermined value; when an engine rotational speed is high beyond its upper limit; or at the time of fuel cut due to deceleration travel operation, the injection stop control is performed.

At the time of the injection stop control as described above, deterioration of exhaust emission is not caused even though the fuel pressure is smaller than a predetermined value. Accordingly, lighting of the warning lamp even in such a case is unnecessary information for the driver, and the lighting of the warning lamp should be limited to the minimum required.

SUMMARY OF THE INVENTION

The present invention addresses at least one of the above disadvantages.

According to the present invention, there is provided an emission deterioration notifying device adapted for a spark-ignition internal combustion engine including a combustion chamber and for a fuel injection system including an injector. The engine is a direct-injection internal combustion engine that injects fuel from the injector directly into the combustion chamber. The emission deterioration notifying device includes a low fuel pressure determining means, an emission deterioration notifying means, and an electric control unit. The low fuel pressure determining means is for determining whether supply pressure of fuel supplied to the injector is in a low fuel pressure state, in which the supply pressure is lower than a predetermined threshold value. The emission deterioration notifying means is for notifying that exhaust emission is deteriorating beyond its allowable range when it is determined that the supply pressure is in the low fuel pressure state. The electric control unit is configured to allow the notification by the emission deterioration notifying means at a time of injection control at which the injection of fuel from the injector is allowed, and is configured to prohibit the notification by the emission deterioration notifying means or to reduce the threshold value at a time of injection stop control at which the injection of fuel from the injector is stopped.

According to the present invention, there is also provided an emission deterioration notifying device adapted for a spark-ignition internal combustion engine including a combustion chamber and a catalyst device that purifies exhaust gas and for a fuel injection system including an injector. The engine is a direct-injection internal combustion engine that injects fuel from the injector directly into the combustion chamber. The emission deterioration notifying device includes a low fuel pressure determining means, an emission deterioration notifying means, and an electric control unit. The low fuel pressure determining means is for determining whether supply pressure of fuel supplied to the injector is in a low fuel pressure state, in which the supply pressure is lower than a predetermined threshold value. The emission deterioration notifying means is for notifying that exhaust emission is deteriorating beyond its allowable range when it is determined that the supply pressure is in the low fuel pressure state. The electric control unit is configured to allow the notification by the emission deterioration notifying means at a time of deactivation at which the catalyst device has not reached a catalytic activation temperature, and is configured to prohibit the notification by the emission deterioration notifying means or to reduce the threshold value at the time of activation at which the catalyst device has the catalytic activation temperature or higher.

According to the present invention, there is further provided an emission deterioration notifying device adapted for a spark-ignition internal combustion engine including a combustion chamber and for a fuel injection system including an injector. The engine is a direct-injection internal combustion engine that injects fuel from the injector directly into the combustion chamber. The emission deterioration notifying device includes a low fuel pressure determining means, an emission deterioration notifying means, and an electric control unit. The low fuel pressure determining means is for determining whether supply pressure of fuel supplied to the injector is in a low fuel pressure state, in which the supply pressure is lower than a predetermined threshold value. The emission deterioration notifying means is for notifying that exhaust emission is deteriorating beyond its allowable range when it is determined that the supply pressure is in the low fuel pressure state. The electric control unit is configured to allow the notification by the emission deterioration notifying means when the engine is in a low temperature state in which temperature of the engine has not reached a predetermined temperature, and is configured to prohibit the notification by the emission deterioration notifying means or to reduce the threshold value when the engine is in a high temperature state in which the temperature of the engine is equal to or higher than the predetermined temperature.

In addition, according to the present invention, there is provided an emission deterioration notifying device adapted for a spark-ignition internal combustion engine including a combustion chamber and for a fuel injection system including an injector. The engine is a direct-injection internal combustion engine that injects fuel from the injector directly into the combustion chamber. The emission deterioration notifying device includes an injection prohibition control means, a confirmation means, and an emission deterioration notifying means. The injection prohibition control means is for prohibiting the injection of fuel from the injector in a period after starting of the engine is begun until supply pressure of fuel supplied to the injector rises to reach a predetermined threshold value. The confirmation means is for confirming whether fuel is erroneously injected in the period during which the injection of fuel is prohibited by the injection prohibition control means. The emission deterioration notifying means is for notifying that exhaust emission is deteriorating beyond its allowable range when it is confirmed by the confirmation means that fuel is erroneously injected.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Figure 1:
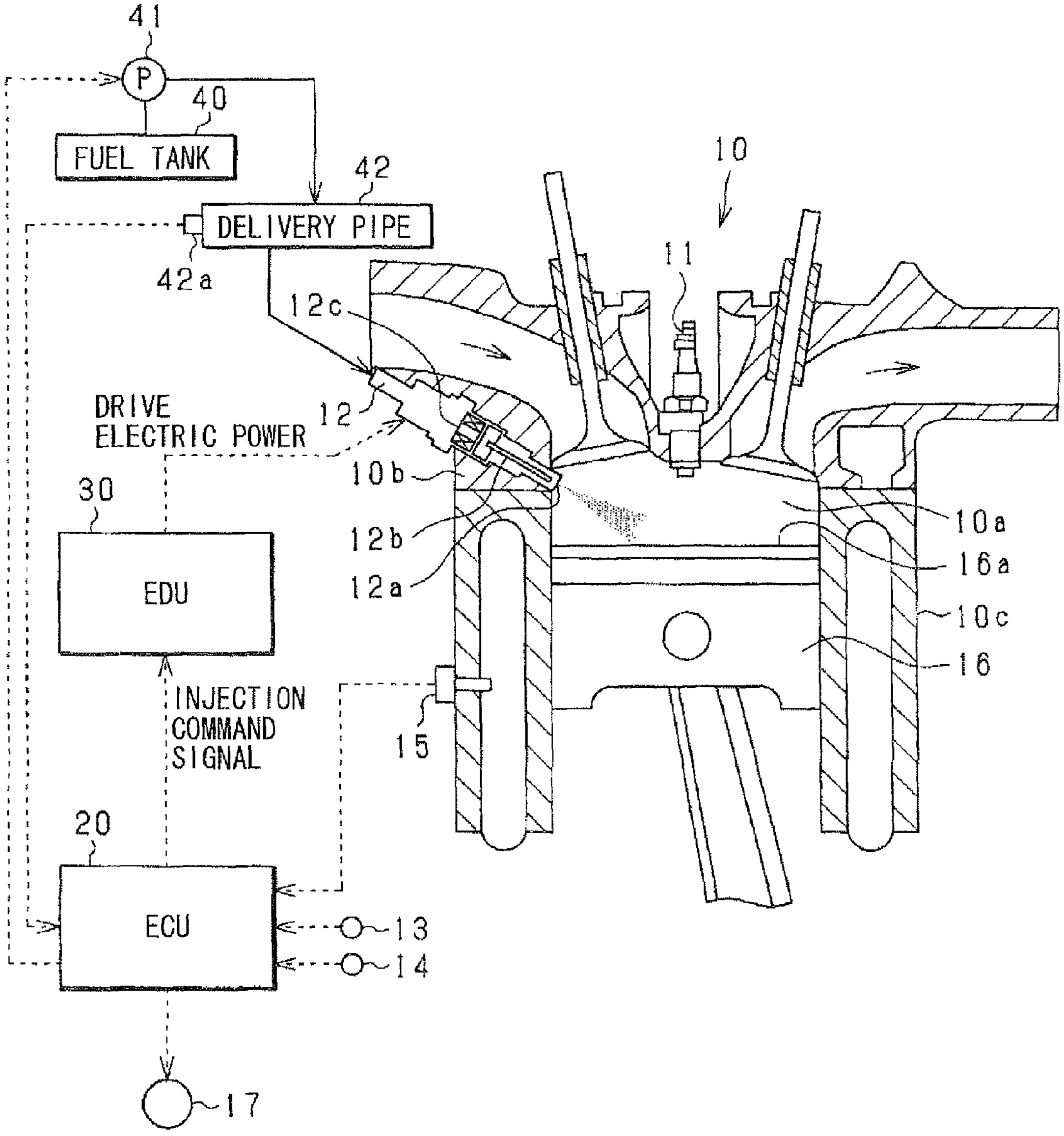
FIG. 1 is a diagram illustrating an internal combustion engine and a fuel injection system, to which an emission deterioration notifying device in accordance with a first embodiment of the invention is applied.

Embodiments of the invention are described below with reference to the accompanying drawings. The same numerals are used in the drawings to indicate the same or equivalent parts in the following embodiments, and the preceding description of the component having the same numeral is referred to when explaining the parts with the same numerals.

First Embodiment

FIG. 1 illustrates an internal combustion engine 10 and a fuel injection system, to which an emission deterioration notifying device of the present embodiment is applied. This engine 10 is disposed in a vehicle to serve as a drive source for travel. This engine 10 is a spark ignition type internal combustion engine having an ignition plug 11, and is a direct injection type internal combustion engine that directly injects fuel into a combustion chamber 10*a*. In the example shown in FIG. 1, an injector 12 that injects fuel into a cylinder block 10*b* of the engine 10 is attached. The operation of the injector 12 is controlled through a drive unit (electronic drive unit: EDU 30) by an injection command signal which is outputted from a control unit (electric control unit: ECU 20).

The injector 12 includes a needle valve 12*b* (valving element) that opens or closes a nozzle hole 12*a*, and an electromagnetic solenoid 12*c* that operates the needle valve 12*b* to open or close the nozzle hole 12*a*. The nozzle hole 12*a* is arranged to be exposed to the combustion chamber 10*a*. Upon supply of drive electric power, which is controlled by the EDU 30, to the electromagnetic solenoid 12*c*, the needle valve 12*b* is operated to open the nozzle hole 12*a*, and fuel is thereby injected through the nozzle hole 12*a*. When the supply of drive electric power is stopped, the needle valve 12*b* is operated to close the nozzle hole 12*a*, and the fuel injection through the nozzle hole 12*a* is thereby stopped. Accordingly, through the control of supply start timing for the drive electric power, valve opening timing of the nozzle hole 12*a* is controlled so as to control injection start timing. Through the control of a supply period for the drive electric power, a valve opening period for the nozzle hole 12*a* is controlled so as to control an injection quantity.

The fuel in a fuel tank 40 is pressure-fed into a delivery pipe 42 (pressure accumulation container) through a high pressure pump 41 (fuel pump), and the fuel injection system is configured such that the high pressure fuel accumulated in the delivery pipe 42 is distributed and supplied to the injector 12 for each cylinder. A target pressure value (target supply pressure Ptrg) for the pressure (supply pressure Pc) in the delivery pipe 42 is set in accordance with an operational state of the engine 10, such as an engine rotational speed or an engine load. The discharge amount from the high pressure pump 41 is controlled, such that a detection value (supply pressure Pc) by a fuel pressure sensor 42*a* attached to the delivery pipe 42 coincides with the target supply pressure Ptrg. The high pressure pump 41 is a mechanical pump that is driven by torque transmitted from an output shaft of the engine 10.

Next, a fuel injection control device that controls the operation of the injector 12, i.e., the ECU 20 (injection command means) and the EDU 30 (drive circuit) that control a state of electric power supply to the electromagnetic solenoid 12*c*, will be described.

Figure 2:
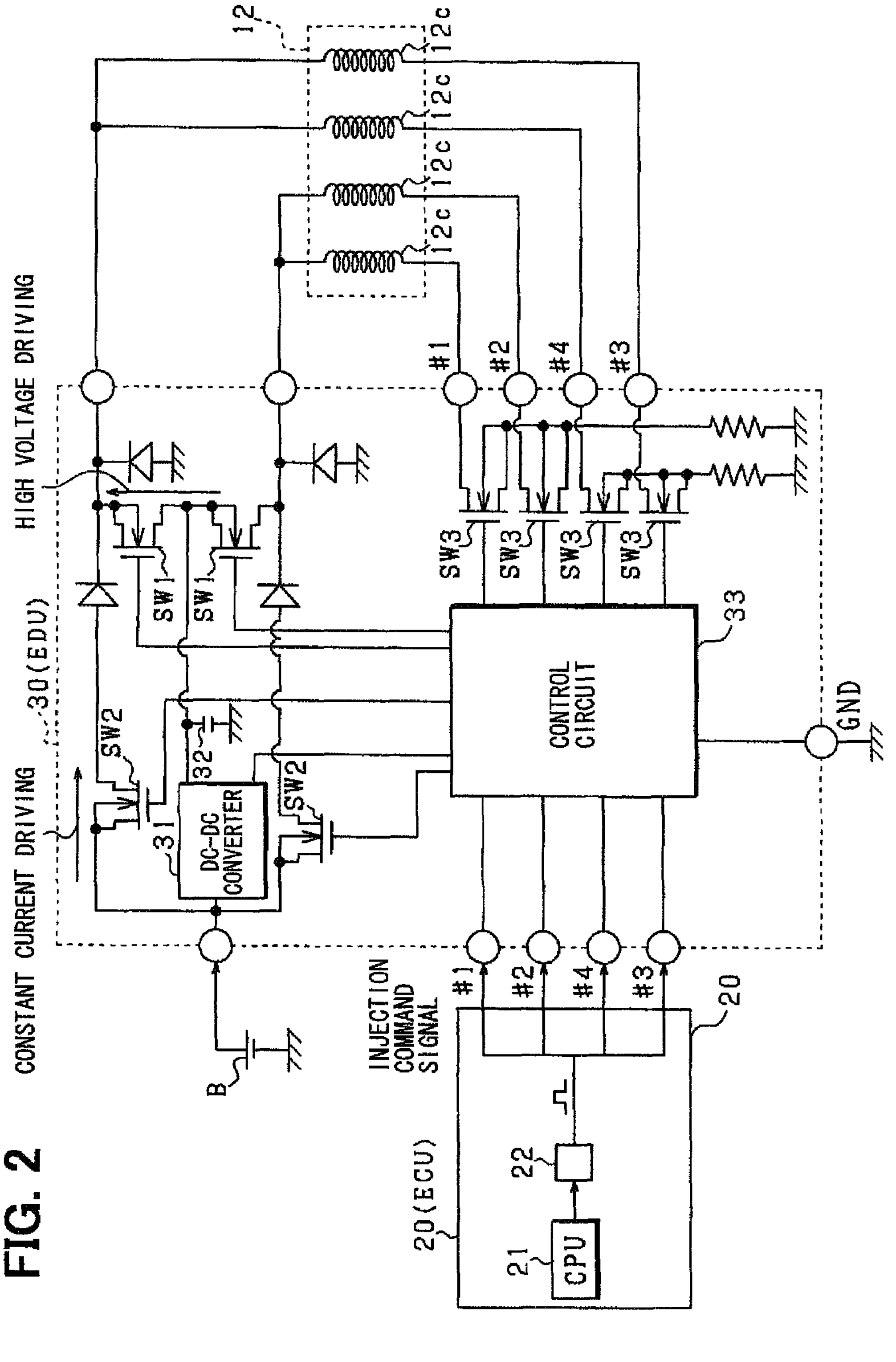
FIG. 2 is a diagram illustrating circuit configurations for an electronic drive unit (EDU) and an electronic control unit (ECU) in FIG. 1.

Detection values by various sensors, such as a crank angle sensor 13 that detects a crank angle, an air flow meter 14 that detects the intake air amount, and a water temperature sensor 15 that detects temperature of cooling water for cooling the engine 10, are inputted into the ECU 20. The ECU 20 calculates an engine rotation speed based on the detection value by the crank angle sensor 13, and calculates the engine load based on the detection value by the air flow meter 14. Ignition timing of the ignition plug 11, target injection quantity and target injection timing for fuel are calculated based on the rotation speed, the load, and the water temperature detected by the water temperature sensor 15. The injection command signal, which is set to achieve these calculated target injection quantity and target injection timing, is outputted to the EDU 30. As illustrated in FIG. 2, when a central processing unit (CPU) 21 of the ECU 20 commands a pulse output circuit 22 to generate a pulse (pulse-on), the pulse of the injection command signal is outputted from the pulse output circuit 22 at the commanded timing.

The ECU 20 switches between stratified combustion and homogeneous combustion based on the engine rotation speed and the engine load. For example, in a range of a low rotation speed and a low load, such as at the time of idle operation or at the time of traveling an urban area, the ECU 20 switches into the stratified combustion at a lean air-fuel ratio (e.g., 17 to 50) to improve fuel efficiency. In a range of a high rotation speed and a high load, such as at the time of high speed operation, acceleration traveling, or hill-climbing traveling, the ECU 20 switches into the homogeneous combustion at an air-fuel ratio near a stoichiometric ratio (e.g., 12 to 15) to improve engine output.

In the stratified combustion, fuel is injected at a later stage of a compression stroke in which a piston 16 goes up. Accordingly, an air-fuel mixture including the injected fuel is collected in the vicinity of the ignition plug 11 as a rich air-fuel mixture along a shape of a piston top surface 16*a*. On the other hand, in the homogeneous combustion, fuel is injected in an intake stroke in which the piston 16 goes down. Accordingly, the sprayed fuel is agitated in the combustion chamber 10*a* during the compression stroke to become a homogeneous air-fuel mixture.

Configuration of the EDU 30 will be described in reference to FIG. 2. The EDU 30 is a unitized device including high voltage generation circuits 31, 32 that boost voltage of a battery disposed in the vehicle to generate high voltage, and a switching means for supplying electricity of the generated high voltage to the injector 12 (electromagnetic solenoid 12*c*) based on the injection command signal.

The high voltage generation circuits 31, 32 include a DC-DC converter 31 that boosts a voltage (12V) of an in-vehicle battery B, and a boost capacitor 32 that is charged (electricity accumulation) with the high-voltage electricity boosted by the DC-DC converter 31. The switching means includes switching elements SW1, SW2, SW3 that perform ON/OFF operation in accordance with the injection command signal from the ECU 20, and controls a state of electric power supply to the electromagnetic solenoid 12*c* of the injector 12. More specifically, the switching means performs control of switching between the supply of high voltage electricity with which the boost capacitor 32 is charged; the supply of low-voltage electricity fed by the in-vehicle battery B; and no supply of either electricity, to the electromagnetic solenoid 12*c*.

The EDU 30 includes a control circuit 33 that outputs a switch command signal, which is in accordance with the injection command signal from the ECU 20, to each gate of the switching elements SW1, SW2, SW3, and the switching elements SW1, SW2, SW3 are operated in accordance with this switch command signal. Which of the respective electromagnetic solenoids 12*c* of the cylinders to be energized is selected through the operation of the switching element SW3. Accordingly, the injector 12 corresponding to the switching element SW3 which has been turned on, is put into an injectable state.

Through the operations of the switching elements SW1, SW2, the control circuit 33 switches between the supply of high-voltage electricity from the boost capacitor 32 and the supply of low-voltage electricity from the in-vehicle battery B. In the case of the supply of low-voltage electricity, for example, the switching element SW2 is turned on and the switching element SW1 is turned off. In the case of the supply of high-voltage electricity, the switching element SW1 is turned on and the switching element SW2 is turned off. During a period in which the switching element SW1 is turned off, the boost capacitor 32 is charged with the high-voltage electricity from the DC-DC converter 31. During a period in which the switching element SW1 is turned on, the electricity, with which the boost capacitor 32 has been charged, can be discharged into the electromagnetic solenoid 12*c*.

One mode of the operations of the ECU 20 and the EDU 30 in the case of the operation of the needle valve 12*b* to open or close the nozzle hole 12*a* only once will be described with reference to FIGS. 3A to 3E.

Figures 3A, 3B, 3C, 3D, 3E:
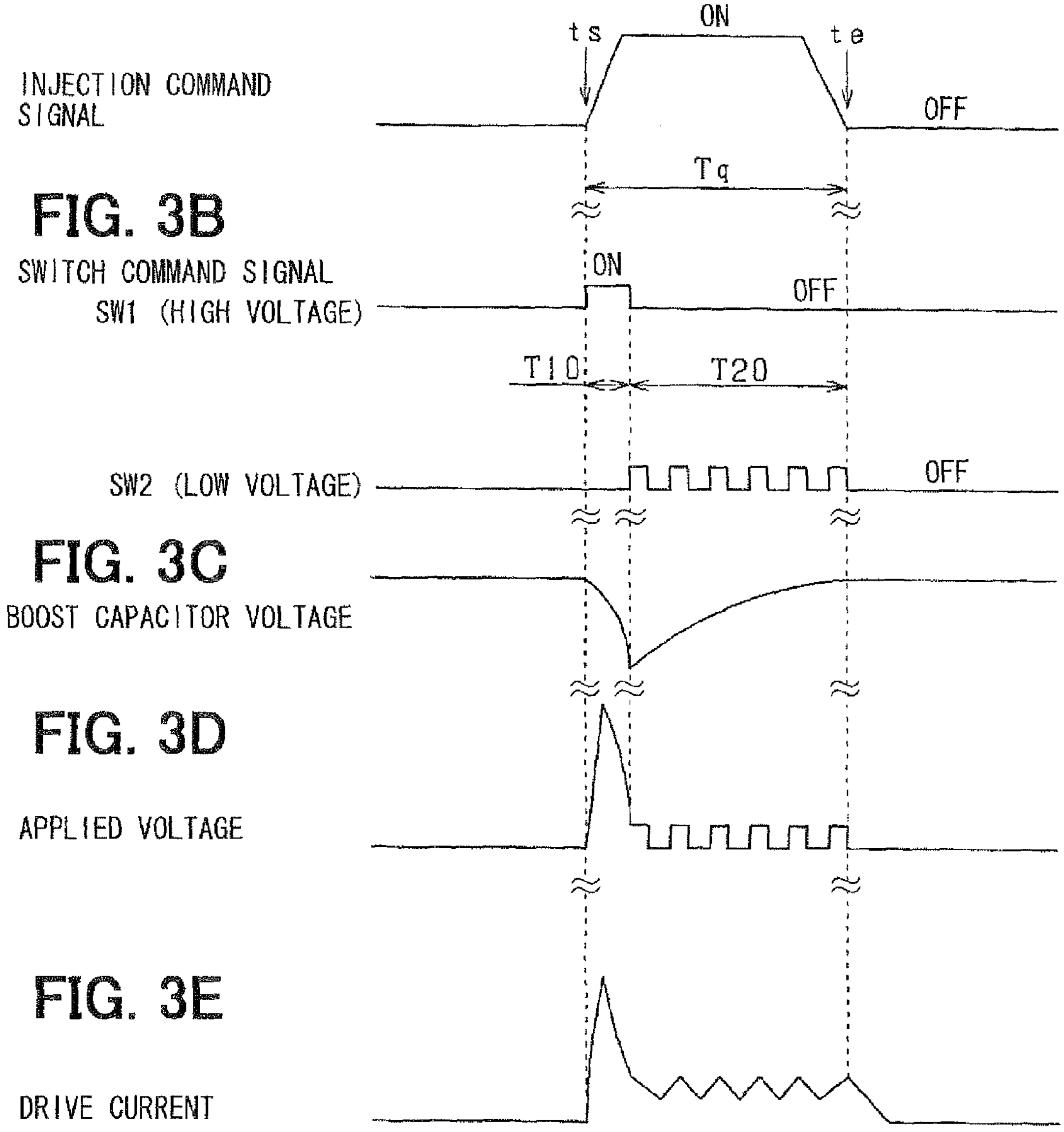
FIG. 3A is a diagram illustrating an injection command signal in one mode of operations of the ECU and the EDU in FIG. 2.
FIG. 3B is a diagram illustrating a switch command signal in the one mode of operations of the ECU and the EDU in FIG. 2.
FIG. 3C is a diagram illustrating boost capacitor voltage in the one mode of operations of the ECU and the EDU in FIG. 2.
FIG. 3D is a diagram illustrating applied voltage in the one mode of operations of the ECU and the EDU in FIG. 2.
FIG. 3E is a diagram illustrating a drive current in the one mode of operations of the ECU and the EDU in FIG. 2.

FIG. 3A illustrates the injection command signal outputted to EDU 30 from the ECU 20. The injection is carried out during an ON period for this signal, and the injection is stopped during an OFF period. FIG. 3B illustrates operating states of the switching elements SW1, SW2. The high-voltage electricity is supplied to the electromagnetic solenoid 12*c* of the injector 12 during an ON period for the switching element SW1. The low-voltage electricity is supplied to the electromagnetic solenoid 12*c* during an ON period for the switching element SW2. FIG. 3C illustrates a voltage change (charge state) of the boost capacitor 32. FIG. 3D illustrates a change of voltage applied to the electromagnetic solenoid 12*c*. FIG. 3E illustrates a change of a drive current flowing along the electromagnetic solenoid 12*c*.

Upon command of an injection start by the injection command signal (see a numeral "ts"), the switching element SW1 is first turned on once (see FIG. 3B), and electricity is discharged through the electromagnetic solenoid 12*c* from the boost capacitor 32 (see FIG. 3C). Accordingly, the high-voltage electricity is supplied to the electromagnetic solenoid 12*c*. Thus, the applied voltage rapidly rises and the drive current rapidly increases (see a numeral "T10"). As a result, the needle valve 12*b* starts to open the nozzle hole 12*a*.

After the high-voltage electricity is supplied through the ON operation of the switching element SW1 as described above, the switching element SW1 is turned off and the switching element SW2 is turned on, so that the low-voltage electricity is supplied to the electromagnetic solenoid 12*c*. In this supply of low-voltage electricity, ON/OFF switching operation for the switching element SW2 is repeated multiple times (see FIG. 3B). Accordingly, the low-voltage electricity is repeatedly supplied from the in-vehicle battery B to the electromagnetic solenoid 12*c*, and a certain drive current (constant current) flows (see a numeral "T20"). As a result, the needle valve 12*b*, which has been lifted up to a maximum lifted position through the supply of high-voltage electricity, maintains this lift position.

After that, when injection stop is commanded by the injection command signal (see a numeral "te"), both the switching elements SW1, SW2 are turned off (see FIG. 3B). Accordingly, the electric power supply to the electromagnetic solenoid 12*c* is stopped (see FIGS. 3D and 3E), and the needle valve 12*b* starts to close the nozzle hole 12*a* (lift down). By turning on and off the injection command once as described above, one opening-closing operation of the needle valve 12*b* is completed.

In the above-described direct injection type engine 10, the injection in the compression stroke is required to be enabled by setting the pressure in the delivery pipe 42 (supply pressure Pc) to be high in comparison with the port injection type. Also, it is important in improvement of the exhaust emission to make high the supply fuel pressure to promote atomization of the injected fuel. Accordingly, in the present embodiment, if the supply pressure Pc is smaller than a predetermined value (threshold values Pth1, Pth2 for EM, which are hereinafter described in greater detail), it is determined that the vehicle is in an emission deterioration state, in which the exhaust emission is deteriorating beyond its allowable range, so as to control a warning lamp 17 (emission deterioration notifying means) illustrated in FIG. 1 to be turned on.

Injection stop control that stops fuel injection from the injector 12 may be performed even though the engine 10 is in operation. If the engine rotational speed NE is high rotation beyond its upper limit, for example, damages to various components that constitute the engine 10 are obviated through the injection stop control. In addition, fuel efficiency of the vehicle may be improved through the injection stop control at the time of deceleration travel operation.

Figure 4A:
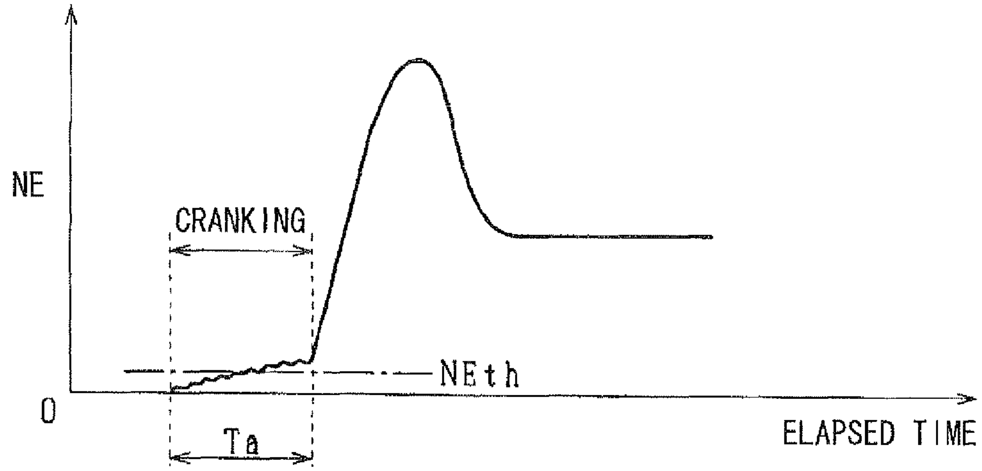
FIG. 4A is a timing diagram illustrating time change of engine rotational speed to explain a determination method for a fuel pressure abnormal condition and a determination method for an emission deterioration state in accordance with the first embodiment.
Figure 4B:
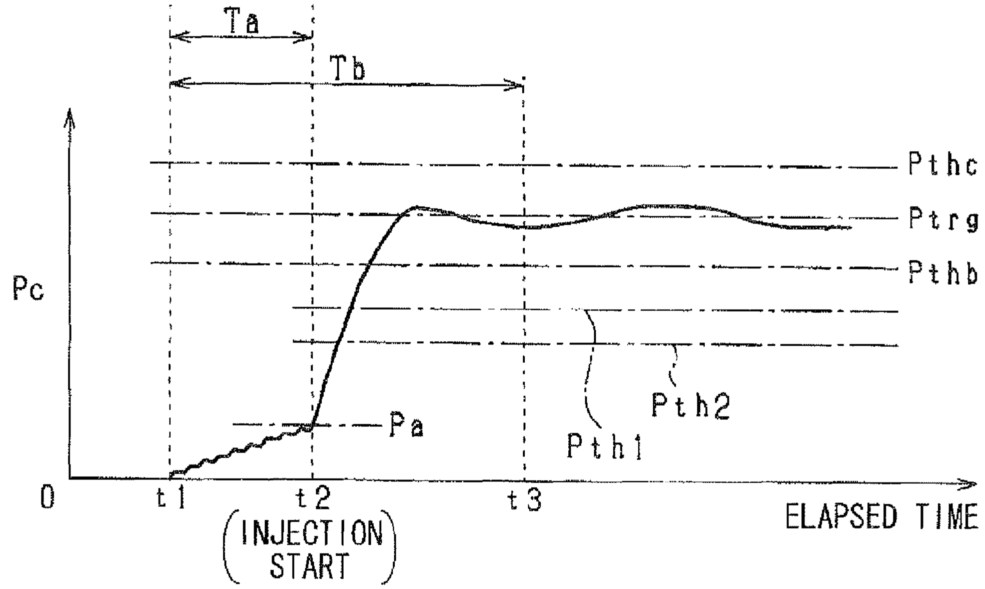
FIG. 4B is a timing diagram illustrating time change of supply pressure Pc to explain the determination method for the fuel pressure abnormal condition and the determination method for the emission deterioration state in accordance with the first embodiment.

The injection stop control may be performed in a fuel pressure increase period Ta illustrated in FIGS. 4A and 4B. The technical meaning of the injection stop control in this case will be described below in reference to FIGS. 4A and 4B. FIG. 4A illustrates time variation of the engine rotational speed NE at the time of the start of the engine 10, and FIG. 4B illustrates time variation of the supply pressure Pc.

First, when a starter motor is driven at a point of t1, the high pressure pump 41 starts its drive to gradually increase the supply pressure Pc. At the time of cold start where a coolant temperature detected by the water temperature sensor 15 is smaller than a predetermined value, the injection is not started until the supply pressure Pc increases to a predetermined value Pa, and the fuel injection from the injector 12 is started at a point of t2 that Pc=Pa is satisfied. Or, the fuel injection is started after elapse of the preset given time Ta. If the coolant temperature is the predetermined value or higher, the fuel injection from the injector 12 is started upon increase of the engine rotational speed NE to a predetermined value NEth. Additionally, the predetermined period Ta is set to be longer than a time required for the engine rotational speed NE to reach the predetermined value NEth.

A period from the point of t1 at which the drive of the starter motor is started to the point of t2, or a period before the elapse of the predetermined time Ta, corresponds to a period for performing the "injection stop control" (cold start injection stop period). Because the supply pressure Pc has not sufficiently risen in this period, atomization of the injected fuel cannot be expected. Moreover, there is concern that the insufficient rise of the supply pressure Pc may cause deterioration of exhaust emission due to the time of cold start. Accordingly, in the present embodiment, the injection stop control is carried out during the above-described cold start injection stop period.

When fuel injection is started at the point of t2, the supply pressure Pc also sharply rises in accordance with a rapid increase of the engine rotational speed NE. After that, the discharge amount from the high pressure pump 41 is controlled such that the supply pressure Pc reaches the target supply pressure Ptrg.

After that, if the supply pressure Pc is smaller than the threshold values Pth1, Pth2 for EM after a predetermined period Tb has elapsed from the point of t1, determination of the emission deterioration state caused by a low fuel pressure state is made to turn on the warning lamp 17 in the case of the stratified combustion, emission deterioration due to insufficient fuel pressure becomes marked as compared with the case of the homogeneous combustion. Accordingly, in the present embodiment, the threshold value Pth1 for EM at the time of the stratified combustion is set at a higher value than the threshold value Pth2 for EM at the time of the homogeneous combustion.

The ECU 20 (abnormality determination means or diagnostic signal outputting means) determines whether the supply pressure Pc is in a fuel pressure abnormal condition that is out of a range between a predetermined lower limit (abnormality lower limit Pthb) and an predetermined upper limit (abnormality upper limit Pthc). This fuel pressure abnormal condition assumes that the supply pressure Pc becomes lower than the lower limit Pthb because of, for example, the abnormality of reduction of the pump discharge amount due to abnormality of the high pressure pump 41 or damage to a pipe connecting the delivery pipe 42 and the high pressure pump 41, Furthermore, it is assumed that the supply pressure Pc becomes higher than the upper limit Pthc because of the abnormality of increase of the pump discharge amount due to abnormality of the high pressure pump 41 or progression of foreign matter adhesion to the nozzle hole 12*a*.

To sum up, the determination of the fuel pressure abnormal condition is to determine whether there is an abnormality of the fuel injection system, such as the high pressure pump 41, the delivery pipe 42, the injector 12, and the pipe. This determination is made regardless of whether the exhaust emission is deteriorating beyond its allowable range (i.e., whether the vehicle is in the emission deterioration state). If it is determined that the pressure Pc is in the fuel pressure abnormal condition, the diagnostic signal indicating that there is an abnormality of the fuel injection system is outputted. This diagnostic signal is a signal that is outputted and stored to notify a repair worker at a car dealer, for example, and is not for turning on the warning lamp 17. Nevertheless, as a modification to the present embodiment, the warning lamp 17 may be turned on if it is determined that the pressure Pc is in the fuel pressure abnormal condition and the diagnostic signal is thereby outputted.

The abnormality lower limit Pthb that is used in the determination of the fuel pressure abnormal condition is set at a higher value than the threshold values Pth1, Pth2 for EM that is used in the determination of the emission deterioration state. Therefore, the lower limit Pthb is set such that there is less opportunity to determine that the vehicle is in the emission deterioration state than the opportunity to determine that the pressure Pc is in the fuel pressure abnormal condition.

Figure 5:
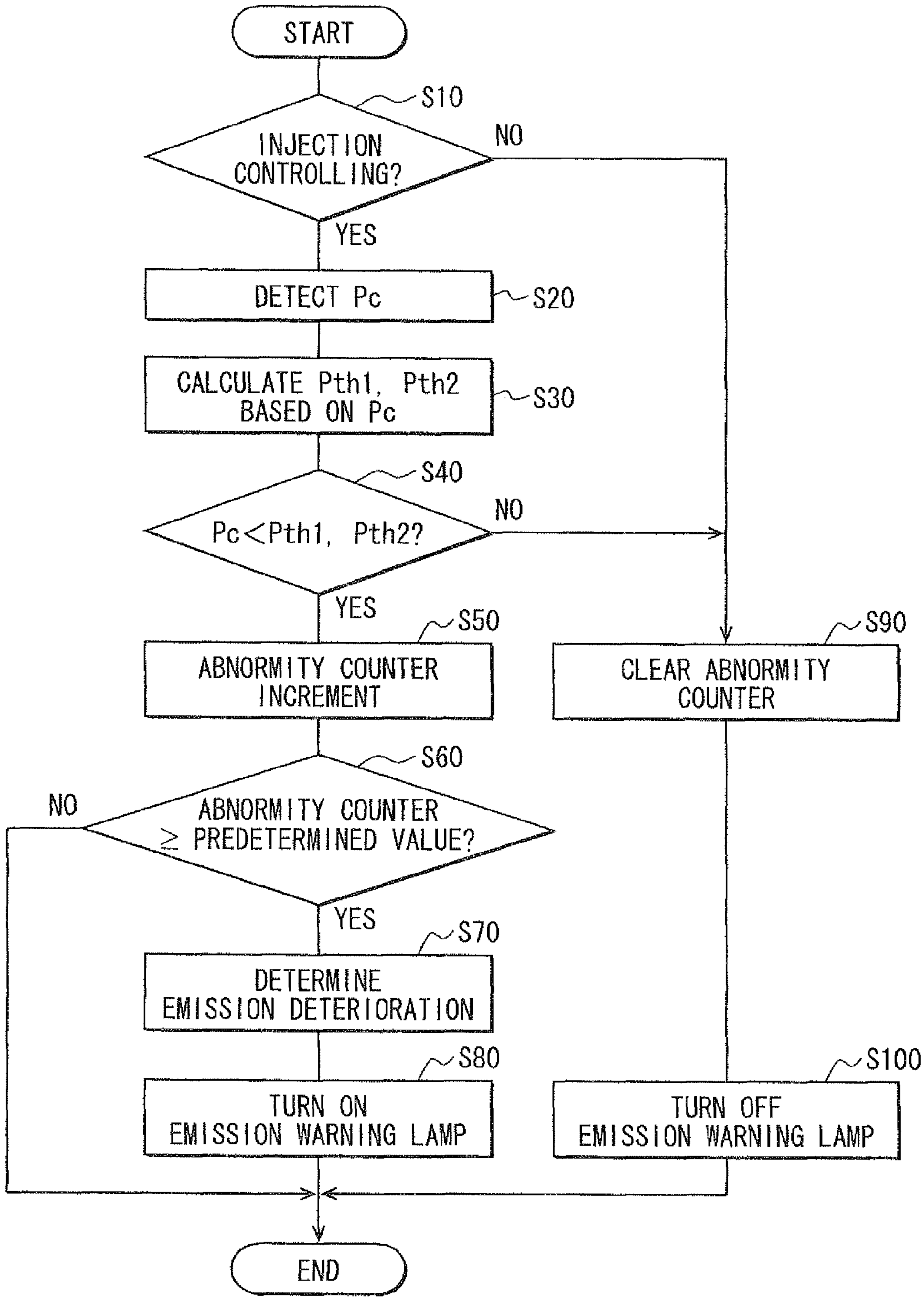
FIG. 5 is a flow chart illustrating a control procedure for an emission warning lamp in FIG. 1.

FIG. 5 is a flow chart illustrating a procedure for controlling the operation of the warning lamp 17 by a microcomputer of the ECU 20, and this processing is repeatedly performed with a given period (e.g., with a period of calculation executed by the above-described CPU).

First, it is determined at S10 in FIG. 5 whether the ECU 20 is in the process of performing the injection stop control. If it is determined that the injection stop control is not being performed and the ECU 20 is controlling the injection (S10: YES), the supply pressure Pc based on the detection value by the fuel pressure sensor 42*a* is obtained at the following S20. At the next S30, the determination threshold values Pth1, Pth2 are calculated based on the obtained supply pressure Pc. For example, a value that is obtained by multiplying the supply pressure Pc by a predetermined value $\alpha$ ($0<\alpha<1$) is calculated as the determination threshold values Pth1, Pth2. At the time of control of the stratified combustion, the predetermined value $\alpha$ is set to be a higher value as compared with at the time of control of the homogeneous combustion. For example, at the time of the control of stratified combustion, the value $\alpha$ is set at $\alpha=0.8$, and an equation: Pth1=Pc×$\alpha$ is employed. At the time of the control of homogeneous combustion, the value $\alpha$ is set at $\alpha=0.7$, and an equation: Pth2=Pc×$\alpha$ is employed.

Instead of the calculation of the determination threshold values Pth1, Pth2 based on the supply pressure Pc, the determination threshold values Pth1, Pth2 may be calculated based on the target supply pressure Ptrg. The target supply pressure Ptrg is set to be a higher value at the time of the control of stratified combustion than at the time of the control of homogeneous combustion.

Next, at S40 (low fuel pressure determining means), it is determined whether the supply pressure Pc obtained at S20 is lower than the determination threshold values Pth1, Pth2 calculated at S30. Then, for each determination of Pc<Pth1, Pth2 (S40: YES), an abnormality counter is incremented by one at the subsequent S50. If it is determined at the following S60 that the abnormality counter is a predetermined value or above, it is determined at S70 that the vehicle is in the above-described emission deterioration state, and at S80, the operation of the warning lamp 17 is controlled to turn on the warning lamp 17. In short, it is determined that the vehicle is in the emission deterioration state on condition that the state of Pc<Pth1, Pth2 continues for a predetermined time or longer.

If it is determined at S10 that the ECU 20 is performing the injection stop control (S10: NO), or if it is determined that Pc≥Pth1, Pth2 is satisfied (S40: NO), the value of the abnormality counter is reset at 0 (zero) at the subsequent S90, and the operation of the warning lamp 17 is controlled to turn off the warning lamp 17 at S100.

In the present embodiment, if the ECU 20 is controlling the injection (S10: YES), lighting actuation of the warning lamp 17 is permitted; and if the ECU 20 is performing the injection stop control (S10: NO), the lighting actuation of the warning lamp 17 is prohibited regardless of whether the supply pressure Pc is smaller than the determination threshold values Pth1, Pth2. Thus, lighting of the warning lamp 17 even at the time that the ECU 20 is performing the injection stop control and the vehicle cannot be put into the emission deterioration state, can be avoided; and if the supply pressure Pc becomes smaller than the determination threshold values Pth1, Pth2 during the injection control, unnecessary information is reduced and the driver can be appropriately notified in notifying a driver of the vehicle of the deterioration of exhaust emission by turning on the warning lamp 17.

Determination of abnormality in the fuel injection system and determination of emission deterioration are made separately, and the determination threshold values Pth1, Pth2 used in determination of exhaust emission deterioration are set at a lower value than the lower limit Pthb used in the determination of abnormality in the fuel injection system. Accordingly, although there is more opportunity to determine that the pressure Pc is in the fuel pressure abnormal condition than the opportunity to determine that the vehicle is in the emission deterioration state, the diagnostic signal is only outputted without turning on the warning lamp 17 at the time of the fuel pressure abnormal condition. Thus, undue lighting actuation of the warning lamp 17 can be avoided.

The determination threshold values Pth1, Pth2 used in determination of exhaust emission deterioration are variably set in accordance with the target supply pressure Ptrg or the supply pressure Pc. Accordingly, whether the exhaust emission is deteriorating beyond its allowable range is accurately determined so as to notify the driver thereof.

In determining at S10 in FIG. 5 whether the ECU 20 is performing the injection stop control, the ECU 20 is considered to be performing the injection stop control during a period after the point of t1 until the predetermined time Tb elapses, and lighting actuation of the warning lamp 17 is prohibited. Accordingly, determination of Pc<Pth1, Pth2 being satisfied so as to turn on the warning lamp 17 during the increase of fuel pressure at the time of start of the engine 10 can be avoided. Thus, undue lighting actuation of the warning lamp 17 can be avoided. A period after the point of t2, at which fuel injection is started, until a predetermined time elapses, may be considered to be for the injection stop control, to prohibit the lighting actuation of the warning lamp 17.

A first modification to the first embodiment will be described. In the present first modification, a catalyst device (not shown) on which a catalyst for purifying a particular component (e.g., HC, CO, and NOx) in exhaust gas is mounted, is attached to an exhaust pipe of the engine 10. The processing at S10 in FIG. 5 is modified to "determination whether the catalyst device has reached a catalytic activation temperature". At the time of deactivation at which the catalyst device has not reached the catalytic activation temperature (S10: YES), the processing at S20 to S80 is performed to allow lighting actuation of the warning lamp 17. On the other hand, at the time of activation at which the catalyst device has reached the catalytic activation temperature (S10: NO), the processing at S90, S100 is performed to prohibit lighting actuation of the warning lamp 17.

In determining whether the catalyst device is deactivated, the determination may be made based on a detection value (exhaust gas temperature) by an exhaust temperature sensor disposed in the exhaust pipe, or the determination may be made based on a detection value (catalytic temperature) by a catalytic temperature sensor disposed in the catalyst device. Alternatively, after a predetermined time has elapsed from the beginning of start of the engine 10, it may be determined that the catalyst device has reached the catalytic activation temperature.

In the present first modification, at the time of activation at which the deteriorated portion of emission due to the fuel pressure reduction can be purified to some extent by the catalyst device, the lighting actuation of the warning lamp 17 is prohibited. Accordingly, lighting of the warning lamp 17 even at the time that the vehicle is unlikely to be put into the emission deterioration state can be avoided. Furthermore, if the supply pressure Pc becomes smaller than the determination threshold values Pth1, Pth2 at the time of deactivation, unnecessary information is reduced and the driver can be properly notified in notifying the driver about the deterioration of exhaust emission by turning on the warning lamp 17.

A second modification to the first embodiment will be described. In the present second modification, the processing at S10 in FIG. 5 is modified to "determination whether temperature of the engine 10 has reached a prescribed temperature". At the time of low temperature at which the temperature of the engine 10 has not reached the prescribed temperature (S10: YES), the processing at S20 to S80 is performed to allow lighting actuation of the warning lamp 17. On the other hand, at the time of high temperature at which the temperature of the engine 10 has reached the prescribed temperature (S10: NO), the processing at S90, S100 is performed to prohibit lighting actuation of the warning lamp 17.

In determining whether the temperature of the engine 10 is low, the determination may be made based on the detection value (water temperature) by the water temperature sensor 15, or it may be determined that the temperature of the engine 10 is high after a predetermined time has elapsed from the beginning of start of the engine 10.

In the present second modification, after completion of warming-up operation of the engine 10 whereby a degree of the emission deterioration due to adhesion of the injected fuel on the piston 16 or a cylinder 10*c* is low (at the time of high temperature), the lighting actuation of the warning lamp 17 is prohibited. Accordingly, lighting of the warning lamp 17 even at the time that the vehicle is unlikely to be put into the emission deterioration state can be avoided; and if the supply pressure Pc becomes smaller than the determination threshold values Pth1, Pth2 at the time of low temperature, unnecessary information is reduced and the driver can be properly notified in notifying the driver about the deterioration of exhaust emission by turning on the warning lamp 17.

Second Embodiment

As illustrated in FIGS. 4A and 4B, the supply pressure Pc has not sufficiently risen in the fuel pressure increase period Ta after the point of V1 at which a start of the engine 10 has begun until the supply pressure Pc rises as a result of the drive of the high pressure pump 41 by the starter motor, to reach the predetermined threshold value Pa. Accordingly, there is concern that the exhaust emission deteriorates because atomization of the injected fuel cannot be expected. For this reason, in the present embodiment, similar to the "injection stop control" of the first embodiment, the ECU 20 (injection prohibition control means) prohibits the fuel injection from the injector 12 in the above-described fuel pressure increase period Ta.

Particularly, at the time of cold start at which the coolant temperature is lower than the predetermined value, there is concern that the exhaust emission deteriorates if the supply pressure Pc has not sufficiently risen. Accordingly, prohibition on the injection in the fuel pressure increase period Ta may be performed upon the satisfaction of the condition that the coolant temperature is lower than the predetermined value. In the case of control of stratified combustion, i.e., fuel is injected in the compression stroke, there is concern that the exhaust emission deteriorates if the supply pressure Pc has not sufficiently risen. Thus, prohibition on the injection in the fuel pressure increase period Ta may be performed upon the satisfaction of the condition that the control of stratified combustion is requested.

Furthermore, the ECU 20 (confirmation means) confirms whether fuel is erroneously injected in the fuel pressure increase period Ta during which injection is prohibited. For example, it is confirmed whether drive electric power is outputted from the EDU 30 in the fuel pressure increase period Ta, and if the output of drive electric power is detected, determination that fuel is being erroneously injected may be made. More specifically, the voltage between the switching element SW3 and the electromagnetic solenoid 12*c* or the electric current flowing through the electromagnetic solenoid 12*c* may be detected; and based on these detection values, whether or not the drive electric power is outputted may be determined. Or, whether the injection command signal is outputted from the ECU 20 during the fuel pressure increase period Ta may be confirmed, and if the output of the injection command signal is detected, determination that fuel is being erroneously injected may be made.

If it is confirmed that fuel is being erroneously injected in the fuel pressure increase period Ta, it is determined that the vehicle is in the emission deterioration state, in which the exhaust emission is deteriorating beyond its allowable range, so as to control the warning lamp 17 to be turned on.

Figure 6:
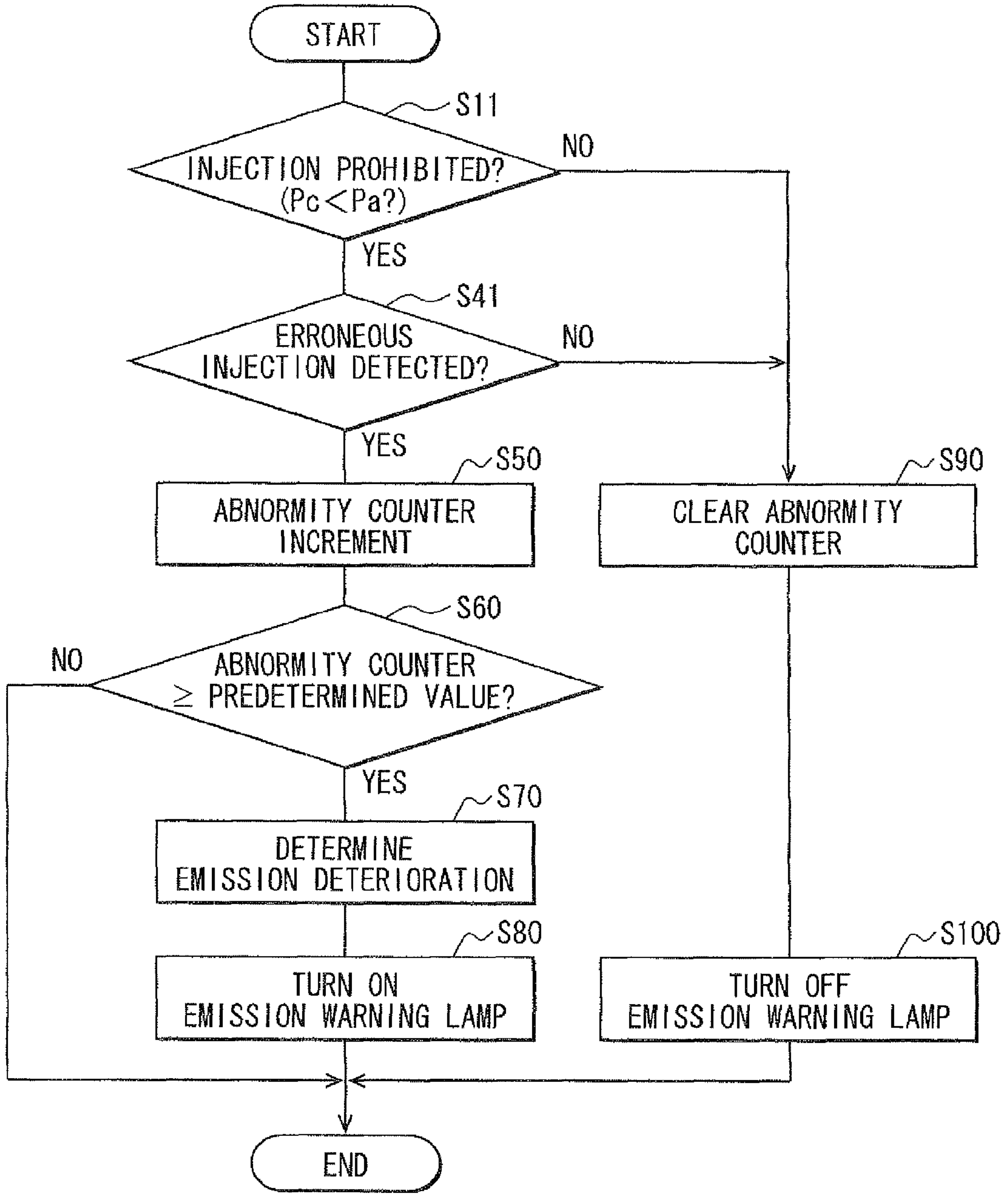
FIG. 6 is a flow chart illustrating a control procedure for an emission warning lamp in accordance with a second embodiment of the invention.

FIG. 6 is a flow chart illustrating a procedure for controlling the operation of the warning lamp 17 by the microcomputer of the ECU 20, and this processing is repeatedly performed with a given period (e.g., with the period of calculation executed by the above-described CPU).

First, whether injection is prohibited is determined at S11 in FIG. 6. Specifically, if the supply pressure Pc is lower than the predetermined value Pa, it is determined that injection is being prohibited. Upon determination that injection is being prohibited (S11: YES), it is confirmed at the following S41 (confirmation means) whether erroneous injection is detected.

Then, the abnormality counter is incremented by one at S50 every time erroneous injection is detected (S41: YES). If it is determined at the following S60 that the abnormality counter is a predetermined value or above, it is determined at S70 that the vehicle is in the above-described emission deterioration state, and at S80, the operation of the warning lamp 17 is controlled to turn on the warning lamp 17. To sum up, it is determined that the vehicle is in the emission deterioration state on condition that the state of erroneous injection detection continues for a predetermined time or longer.

On the other hand, in the case of determination at S11 that injection is not being prohibited (S11: NO), or in the case of determination that erroneous injection is not detected (S41: NO), the value of the abnormality counter is reset at 0 (zero) at the subsequent S90, and the operation of the warning lamp 17 is controlled to turn off the warning lamp 17 at S100.

As a result, in the present embodiment, even if fuel is erroneously injected in the fuel pressure increase period Ta during which fuel injection is prohibited due to a defect, such as a bug of a control program of the microcomputer of the ECU 20 or a failure of the component of the EDU 30, the erroneous injection is detected to turn on the warning lamp 17. Accordingly, unnecessary information is reduced and the driver can be properly notified in notifying the driver about the deterioration of exhaust emission.

Modifications of the above embodiments will be described. The invention is not limited to the descriptions in the above-described embodiments, and may be embodied through the modifications as follows. Furthermore, characteristic structures in the embodiments may be arbitrarily combined.

In the above first embodiment, lighting actuation of the warning lamp 17 may be prohibited at the time of homogeneous combustion, and determination of the emission deterioration state and lighting actuation of the warning lamp 17 may be permitted under condition of the stratified combustion.

In the above second embodiment, the supply pressure Pc at the injection start point may be obtained and stored, and if the supply pressure Pc is equal to or lower than a predetermined value, it may be determined that fuel has been erroneously injected during the injection prohibiting period.

If the temperature of the component of the ECU 20 (e.g., the CPU 21 and the pulse output circuit 22) or the component of the EDU 30 (e.g., the switching elements SW1, SW2, SW3, the converter 31, the boost capacitor 32, and the control circuit 33) is out of a range of an operation ensuring temperature, it is desirable that the lighting of the warning lamp 17 should be prohibited. Specifically, if ambient temperature of the ECU 20 or the EDU 30 becomes out of a range of a preset temperature, lighting of the warning lamp 17 may be prohibited.

In prohibiting information notification by the emission deterioration notifying means during the injection stop control, obtaining of the supply pressure Pc (S20) and execution of the low fuel pressure determination (S40) are prohibited during the injection stop control in the embodiment illustrated in FIG. 5. As a result, information notification during the injection stop control is prohibited. Alternatively, although obtaining of the supply pressure Pc (S20) or the low fuel pressure determination (S40) is carried out even during the injection stop control, information notification during the injection stop control may be prohibited.

In the above first embodiment and its first and second modifications, lighting actuation of the warning lamp 17 is prohibited if negative determination is made at S10. Alternatively, if negative determination is made at S10, correction is made to decrease the determination threshold values Pth1, Pth2 with the lighting actuation of the warning lamp 17 permitted, and the processing at S20 to S80 may be executed. As a result of this, too, at the time of negative determination at S10, the warning lamp 17 is not easily turned on as compared with at the time of positive determination. Therefore, the effect of reducing unnecessary information to properly notify the driver can be produced.

In the above-described embodiments, the warning lamp 17 (indicating means) is employed for the emission deterioration notifying means. However, instead of such a lamp, for example, a buzzer that produces a warning beep may be used as the emission deterioration notifying means. As well, a means for outputting the diagnostic signal without generating the warning lamp 17 or the warning beep may be used as the emission deterioration notifying means. In addition, it is desirable that the warning lamp 17 should be disposed at a position from which the vehicle driver can be notified, such as attachment of the warning lamp 17 to an instrument panel or a meter device in the vehicle interior.

To sum up, the emission deterioration notifying device in accordance with the above embodiments may be described as follows.

The emission deterioration notifying device is adapted for a spark-ignition internal combustion engine 10 including a combustion chamber 10*a* and for a fuel injection system including an injector 12. The engine 10 is a direct-injection internal combustion engine that injects fuel from the injector 12 directly into the combustion chamber 10*a*. The emission deterioration notifying device includes a low fuel pressure determining means S40 and 20, an emission deterioration notifying means 17, and an electric control unit 20. The low fuel pressure determining means S40 and 20 is for determining whether supply pressure Pc of fuel supplied to the injector 12 is in a low fuel pressure state, in which the supply pressure Pc is lower than a predetermined threshold value Pth1 or Pth2. The emission deterioration notifying means 17 is for notifying that exhaust emission is deteriorating beyond its allowable range when it is determined that the supply pressure Pc is in the low fuel pressure state. The electric control unit 20 is configured to allow the notification by the emission deterioration notifying means 17 at a time of injection control at which the injection of fuel from the injector 12 is allowed, and is configured to prohibit the notification by the emission deterioration notifying means 17 or to reduce the threshold value Pth1 or Pth2 at a time of injection stop control at which the injection of fuel from the injector 12 is stopped.

Accordingly, at the time of injection stop control at which fuel injection is stopped, information notification by the emission deterioration notifying means 17 is prohibited even in a low fuel pressure state. Or, notification cannot be easily made through the reduction of the threshold values Pth1, Pth2 used in the determination of the low fuel pressure state. On the other hand, at the time of injection control at which fuel injection is permitted, the driver is notified of exhaust emission deterioration if the supply pressure Pc is in a low fuel pressure state. Therefore, unnecessary information notification can be reduced in notifying the driver about the deterioration of exhaust emission.

The emission deterioration notifying device is adapted for a spark-ignition internal combustion engine 10 including a combustion chamber 10*a* and a catalyst device that purifies exhaust gas and for a fuel injection system including an injector 12. The engine 10 is a direct-injection internal combustion engine that injects fuel from the injector 12 directly into the combustion chamber 10*a*. The emission deterioration notifying device includes a low fuel pressure determining means S40 and 20, an emission deterioration notifying means 17, and an electric control unit 20. The low fuel pressure determining means S40 and 20 is for determining whether supply pressure Pc of fuel supplied to the injector 12 is in a low fuel pressure state, in which the supply pressure Pc is lower than a predetermined threshold value Pth1 or Pth2. The emission deterioration notifying means 17 is for notifying that exhaust emission is deteriorating beyond its allowable range when it is determined that the supply pressure Pc is in the low fuel pressure state. The electric control unit 20 is configured to allow the notification by the emission deterioration notifying means 17 at a time of deactivation at which the catalyst device has not reached a catalytic activation temperature, and is configured to prohibit the notification by the emission deterioration notifying means 17 or to reduce the threshold value Pth1 or Pth2 at the time of activation at which the catalyst device has the catalytic activation temperature or higher.

If the catalyst device is activated, the deteriorated portion of emission due to the fuel pressure reduction can be purified to a certain extent through the catalyst device. Thus, necessity for information notification by the emission deterioration notifying means 17 is reduced. In view of this regard, in the notifying device of the invention, at the time of activation of the catalyst device, information notification by the emission deterioration notifying means 17 is prohibited even if the supply pressure Pc is in a low fuel pressure state. Or, notification cannot be easily made through the reduction of the threshold values Pth1, Pth2 used in the determination of the low fuel pressure state. On the other hand, at the time of deactivation, the driver is notified of exhaust emission deterioration if the supply pressure Pc is in a low fuel pressure state. Therefore, unnecessary information notification can be reduced in notifying the driver about the deterioration of exhaust emission.

The emission deterioration notifying device is adapted for a spark-ignition internal combustion engine 10 including a combustion chamber 10*a* and for a fuel injection system including an injector 12. The engine 10 is a direct-injection internal combustion engine that injects fuel from the injector 12 directly into the combustion chamber 10*a*. The emission deterioration notifying device includes a low fuel pressure determining means S40 and 20, an emission deterioration notifying means 17, and an electric control unit 20. The low fuel pressure determining means S40 and 20 is for determining whether supply pressure Pc of fuel supplied to the injector 12 is in a low fuel pressure state, in which the supply pressure Pc is lower than a predetermined threshold value Pth1 or Pth2. The emission deterioration notifying means 17 is for notifying that exhaust emission is deteriorating beyond its allowable range when it is determined that the supply pressure Pc is in the low fuel pressure state. The electric control unit 20 is configured to allow the notification by the emission deterioration notifying means 17 when the engine 10 is in a low temperature state in which temperature of the engine 10 has not reached a predetermined temperature, and is configured to prohibit the notification by the emission deterioration notifying means 17 or to reduce the threshold value Pth1 or Pth2 when the engine 10 is in a high temperature state in which the temperature of the engine 10 is equal to or higher than the predetermined temperature.

If temperature of the internal combustion engine 10 is equal to or higher than the predetermined temperature, even though the injected fuel adheres on the piston 16 and the cylinder 10*c* of the engine 10, the fuel immediately evaporates. Therefore, a possibility that exhaust emission may deteriorate markedly is low, and necessity for information notification by the emission deterioration notifying means 17 is thereby reduced. In view of this regard, in the notifying device of the invention, when the engine 10 has high temperature, information notification by the emission deterioration notifying means 17 is prohibited even if the supply pressure Pc is in a low fuel pressure state. Or, notification cannot be easily made through the reduction of the threshold values Pth1, Pth2 used in the determination of the low fuel pressure state. On the other hand, when the engine 10 has low temperature, the driver is notified of exhaust emission deterioration if the supply pressure Pc is in a low fuel pressure state. Therefore, unnecessary information notification can be reduced in notifying the driver about the deterioration of exhaust emission.

The emission deterioration notifying device may further include an abnormality determination means 20 for determining whether the supply pressure Pc of fuel supplied to the injector 12 is in a fuel pressure abnormal condition, in which the supply pressure Pc is lower than a predetermined lower limit Pthb; and a diagnostic signal outputting means 20 for outputting a diagnostic signal, which indicates that there is an abnormality in the fuel injection system, when it is determined that the supply pressure Pc is in the fuel pressure abnormal condition. The threshold value Pth1 or Pth2 used in the determination by the low fuel pressure determining means S40 and 20 may be set at a different value from the lower limit Pthb, which is used in the determination by the abnormality determination means 20.

Purposes are different for the output of the diagnostic signal at the abnormal time and the notification of exhaust emission deterioration. The diagnostic signal at the abnormal time is a signal that is outputted if it is determined that there is abnormality in the fuel injection system irrespective of whether exhaust emission is deteriorating beyond its acceptable range. For this reason, it is desirable that the threshold values Pth1, Pth2 that are used in the determination of exhaust emission deterioration, and the lower limit Pthb that is used in the determination of abnormality in the fuel injection system should be set at different values. The driver may be notified of emission deterioration, whereas the diagnostic signal may is outputted to notify a repair operator about the fuel pressure abnormal condition.

In view of these respects, in the notifying device of the invention, the abnormality determination means 20 and the diagnostic signal outputting means 20; and the low fuel pressure determining means S40 and 20, and the emission deterioration notifying means 17 are separately provided. The threshold values Pth1, Pth2 and the lower limit Pthb, which are used in these respective determinations, are set at different values. Accordingly, abnormality determination and its notifying mode; and determination of emission deterioration and its notifying mode can be set at determination criteria and notifying modes that serve their respective purposes.

The fuel injection system may further include a fuel pump 41 that pressure-feeds fuel to the injector 12. The fuel injection system may control operation of the fuel pump 41 such that the supply pressure Pc of fuel pressure-fed by the fuel pump 41 to the injector 12 reaches a target pressure Ptrg. The threshold value Pth1 or Pth2 may be variably set according to actual pressure of fuel supplied to the injector 12 or the target pressure Ptrg.

In the notifying device of the invention, the threshold values Pth1, Pth2 that are used for determination of emission deterioration are variably set according to the target pressure Ptrg or actual pressure. Accordingly, whether the exhaust emission is deteriorating beyond its allowable range is accurately determined so as to notify the driver thereof. If fuel is injected at the time of the compression stroke of the engine 10, for example, the target pressure Ptrg is high as compared with the case of injection at the time of the intake stroke. The determination threshold values Pth1, Pth2 may be set to be high in accordance with such a increase of the target pressure Ptrg. If the target pressure Ptrg is high, exhaust emission may deteriorate beyond its tolerable range even though the actual pressure is slightly lower than the target pressure Ptrg. Therefore, a difference between the target pressure Ptrg and the determination threshold values Pth1, Pth2 may be set to be smaller as the target pressure Ptrg is higher.

The emission deterioration notifying device is adapted for a spark-ignition internal combustion engine 10 including a combustion chamber 10*a* and for a fuel injection system including an injector 12. The engine 10 is a direct-injection internal combustion engine that injects fuel from the injector 12 directly into the combustion chamber 10*a*. The emission deterioration notifying device includes an injection prohibition control means 20, a confirmation means 20 and S41, and an emission deterioration notifying means 17. The injection prohibition control means 20 is for prohibiting the injection of fuel from the injector 12 in a period Ta after starting of the engine 10 is begun until supply pressure Pc of fuel supplied to the injector 12 rises to reach a predetermined threshold value Pa. The confirmation means 20 and S41 is for confirming whether fuel is erroneously injected in the period Ta during which the injection of fuel is prohibited by the injection prohibition control means 20. The emission deterioration notifying means 17 is for notifying that exhaust emission is deteriorating beyond its allowable range when it is confirmed by the confirmation means 20 and S41 that fuel is erroneously injected.

At the time of start of the engine 10, if fuel is injected in the period Ta before the fuel pressure Pc rises to reach a predetermined threshold value Pa, atomization of the injected fuel cannot be sufficiently promoted, so that deterioration of exhaust emission is caused. Accordingly, in the period Ta until the fuel pressure Pc rises to reach the predetermined threshold value Pa, fuel injection may be prohibited to avoid exhaust emission deterioration. Nevertheless, due to a defect in the control, such as when a bug exists in the control program of the injector 12, fuel may be erroneously injected even in the period Ta during which fuel injection is prohibited. In that case, deterioration of exhaust emission will be caused.

In view of this regard, in the notifying device of the invention, whether fuel is erroneously injected in the period Ta during which fuel injection is prohibited, is confirmed; and if the erroneous injection is confirmed, notify the driver that exhaust emission is deteriorating beyond its permissible range. Accordingly, unnecessary information is reduced and the driver can be properly notified in notifying the driver about the deterioration of exhaust emission.

The fuel injection system may further include: an injection command means 20 for outputting an injection command signal that is set in accordance with an operating state of the engine 10; and a drive circuit 30 that is configured to control drive electric power supplied to the injector 12 based on the injection command signal. The confirmation means 20 and S41 may confirm whether fuel is erroneously injected based on the drive electric power controlled by the drive circuit 30.

If a lift sensor that detects the lift amount of the valving element 12*b*, which opens or closes the nozzle hole 12*a* of the injector 12, is provided, whether fuel is erroneously injected can be confirmed based on the detected lift amount. However, cost increases are caused because of the requirement of the lift sensor. In addition, whether fuel is erroneously injected can be confirmed based on the injection command signal outputted from the injection command means 20. However, if a control state of drive electric power does not correspond to the injection command signal, such as when the drive circuit 30 has an abnormality, whether fuel is erroneously injected cannot be confirmed correctly. In view of these respects, in the notifying device of the invention, it is confirmed whether fuel is erroneously injected based on the drive electric power supplied to the injector 12. Thus, the need is eliminated for the lift sensor, and whether fuel is erroneously injected can be confirmed correctly even if there is abnormality in the drive circuit 30.

Additional advantages and modifications will readily occur to those skilled in the art. The invention in its broader terms is therefore not limited to the specific details, representative apparatus, and illustrative examples shown and described.

What is claimed is:

1. An emission deterioration notifying device adapted for a spark-ignition internal combustion engine including a combustion chamber and for a fuel injection system including an injector, the engine being a direct-injection internal combustion engine that injects fuel from the injector directly into the combustion chamber, the emission deterioration notifying device comprising:

a low fuel pressure determining unit configured to determine whether supply pressure of fuel supplied to the injector is in a low fuel pressure state, in which the supply pressure is higher than a fuel pressure at which fuel injection is allowed and is lower than a predetermined threshold value, wherein the predetermined threshold value is a threshold value for emission (EM);

an emission deterioration notifying unit configured to notify that exhaust emission is deteriorating beyond its allowable range when it is determined that the supply pressure is in the low fuel pressure state; and an electric control unit that is configured to allow the notification by the emission deterioration notifying unit at a time of injection control at which the injection of fuel from the injector is allowed, and that is configured to prohibit the notification by the emission deterioration notifying unit or to reduce the threshold value at a time of injection stop control at which the injection of fuel from the injector is stopped.

2. The emission deterioration notifying device according to claim 1, further comprising:

an abnormality determination unit configured to determine whether the supply pressure of fuel supplied to the injector is in a fuel pressure abnormal condition, in which the supply pressure is lower than a predetermined lower limit; and a diagnostic signal outputting unit configured to output a diagnostic signal, which indicates that there is an abnormality in the fuel injection system, when it is determined that the supply pressure is in the fuel pressure abnormal condition, wherein the threshold value used in the determination by the low fuel pressure determining unit is set at a different value from the lower limit, which is used in the determination by the abnormality determination unit; and wherein the predetermined lower limit is a higher value than the predetermined threshold value.

3. The emission deterioration notifying device according to claim 1, wherein:

the fuel injection system further includes a fuel pump that pressure-feeds fuel to the injector;

the fuel injection system controls operation of the fuel pump such that the supply pressure of fuel pressure-fed by the fuel pump to the injector reaches a target pressure; and the threshold value is variably set according to actual pressure of fuel supplied to the injector or the target pressure.

4. An emission deterioration notifying device adapted for a spark-ignition internal combustion engine including a combustion chamber and a catalyst device that purifies exhaust gas and for a fuel injection system including an injector, the engine being a direct-injection internal combustion engine that injects fuel from the injector directly into the combustion chamber, the emission deterioration notifying device comprising:

a low fuel pressure determining unit configured to determine whether supply pressure of fuel supplied to the injector is in a low fuel pressure state, in which the supply pressure is higher than a fuel pressure at which fuel injection is allowed and is lower than a predetermined threshold value, wherein the predetermined threshold value is a threshold value for emission (EM);

an emission deterioration notifying unit configured to notify that exhaust emission is deteriorating beyond its allowable range when it is determined that the supply pressure is in the low fuel pressure state; and an electric control unit that is configured to allow the notification by the emission deterioration notifying unit at a time of deactivation at which the catalyst device has not reached a catalytic activation temperature, and that is configured to prohibit the notification by the emission deterioration notifying unit or to reduce the threshold value at a time of activation at which the catalyst device has the catalytic activation temperature or higher.

5. The emission deterioration notifying device according to claim 4, further comprising:

an abnormality determination unit configured to determine whether the supply pressure of fuel supplied to the injector is in a fuel pressure abnormal condition, in which the supply pressure is lower than a predetermined lower limit; and a diagnostic signal outputting unit configured to output a diagnostic signal, which indicates that there is an abnormality in the fuel injection system, when it is determined that the supply pressure is in the fuel pressure abnormal condition, wherein the threshold value used in the determination by the low fuel pressure determining unit is set at a different value from the lower limit, which is used in the determination by the abnormality determination unit; and wherein the predetermined lower limit is a higher value than the predetermined threshold value.

6. The emission deterioration notifying device according to claim 4, wherein:

the fuel injection system further includes a fuel pump that pressure-feeds fuel to the injector;

the fuel injection system controls operation of the fuel pump such that the supply pressure of fuel pressure-fed by the fuel pump to the injector reaches a target pressure; and the threshold value is variably set according to actual pressure of fuel supplied to the injector or the target pressure.

7. An emission deterioration notifying device adapted for a spark-ignition internal combustion engine including a combustion chamber and for a fuel injection system including an injector, the engine being a direct-injection internal combustion engine that injects fuel from the injector directly into the combustion chamber, the emission deterioration notifying device comprising:

a low fuel pressure determining unit configured to determine whether supply pressure of fuel supplied to the injector is in a low fuel pressure state, in which the supply pressure is higher than a fuel pressure at which fuel injection is allowed and is lower than a predetermined threshold value, wherein the predetermined threshold value is a threshold value for emission (EM);

an emission deterioration notifying unit configured to notify that exhaust emission is deteriorating beyond its allowable range when it is determined that the supply pressure is in the low fuel pressure state; and an electric control unit that is configured to allow the notification by the emission deterioration notifying unit when the engine is in a low temperature state in which temperature of the engine has not reached a predetermined temperature, and that is configured to prohibit the notification by the emission deterioration notifying unit or to reduce the threshold value when the engine is in a high temperature state in which the temperature of the engine is equal to or higher than the predetermined temperature.

8. The emission deterioration notifying device according to claim 7, further comprising:

an abnormality determination unit configured to determine whether the supply pressure of fuel supplied to the injector is in a fuel pressure abnormal condition, in which the supply pressure is lower than a predetermined lower limit; and a diagnostic signal outputting unit configured to output a diagnostic signal, which indicates that there is an abnormality in the fuel injection system, when it is determined that the supply pressure is in the fuel pressure abnormal condition, wherein the threshold value used in the determination by the low fuel pressure determining unit is set at a different value from the lower limit, which is used in the determination by the abnormality determination unit; and wherein the predetermined lower limit is a higher value than the predetermined threshold value.

9. The emission deterioration notifying device according to claim 7, wherein:

the fuel injection system further includes a fuel pump that pressure-feeds fuel to the injector;

the fuel injection system controls operation of the fuel pump such that the supply pressure of fuel pressure-fed by the fuel pump to the injector reaches a target pressure; and the threshold value is variably set according to actual pressure of fuel supplied to the injector or the target pressure.

10. An emission deterioration notifying device adapted for a spark-ignition internal combustion engine including a combustion chamber and for a fuel injection system including an injector, the engine being a direct-injection internal combustion engine that injects fuel from the injector directly into the combustion chamber, the emission deterioration notifying device comprising:

an injection prohibition control unit configured to prohibit the injection of fuel from the injector in a period after starting of the engine is begun until supply pressure of fuel supplied to the injector rises to reach a predetermined threshold value, wherein the predetermined threshold value is a threshold value at and above which fuel injection is allowed;

a confirmation unit configured to confirm whether fuel is erroneously injected in the period during which the injection of fuel is prohibited by the injection prohibition control unit; and an emission deterioration notifying unit configured to notify that exhaust emission is deteriorating beyond its allowable range when it is confirmed by the confirmation unit that fuel is erroneously injected;

wherein the fuel injection system further includes:

an injection command unit configured to output an injection command signal that is set in accordance with an operating state of the engine; and a drive circuit that is configured to control drive electric power supplied to the injector based on the injection command signal; and the confirmation unit is configured to confirm whether fuel is erroneously injected based on the drive electric power supplied to the injector as controlled by the drive circuit.

* * * * *